United States Patent
Min

(10) Patent No.: US 9,557,762 B2
(45) Date of Patent: Jan. 31, 2017

(54) ACCELERATOR PEDAL APPARATUS WITH VARIABLE PEDAL EFFORT

(71) Applicant: Hyundai Motor Company, Seoul (KR)

(72) Inventor: Jeong Seon Min, Gwagju (KR)

(73) Assignee: Hyundai Motor Company, Seoul (KR)

( * ) Notice: Subject to any disclaimer, the term of this patent is extended or adjusted under 35 U.S.C. 154(b) by 264 days.

(21) Appl. No.: 14/319,907

(22) Filed: Jun. 30, 2014

(65) Prior Publication Data

US 2015/0160682 A1    Jun. 11, 2015

(30) Foreign Application Priority Data

Dec. 9, 2013    (KR) .......................... 10-2013-0152229

(51) Int. Cl.
  *G05G 1/40*    (2008.04)
  *B60K 26/02*   (2006.01)
  *G05G 5/03*    (2008.04)

(52) U.S. Cl.
  CPC ............... *G05G 1/40* (2013.01); *B60K 26/021* (2013.01); *G05G 5/03* (2013.01); *B60K 2026/023* (2013.01); *Y10T 74/20534* (2015.01)

(58) Field of Classification Search
  CPC ............ B60K 26/021; B60K 2026/022; B60K 2026/023; B60K 2026/026; G05G 5/03; G05G 1/38; G05G 1/405; G05G 1/44; G05G 1/40; G01L 5/225; F16F 6/005; F16F 6/00; H01H 21/28; Y10T 74/20558–74/2057; Y10T 74/20534; Y10T 74/2054; Y10T 74/20528; Y10T 74/20888
  See application file for complete search history.

(56) References Cited

U.S. PATENT DOCUMENTS 3,693,474 A * 9/1972 Trick .................... E02F 9/2004
                                                251/233
9,075,427 B2 * 7/2015 Muraji ................. B60K 26/021
(Continued)

FOREIGN PATENT DOCUMENTS

JP    2012-096710 A    5/2012
JP    2012096706 A  *  5/2012
(Continued)

*Primary Examiner* — Daniel Yabut
(74) *Attorney, Agent, or Firm* — Morgan, Lewis & Bockius LLP

(57) ABSTRACT

An accelerator pedal apparatus with a variable pedal effect may include an intermediate bush installed to be moved along an interior space of a pedal housing, a pair of first conductors fixedly installed on one surface of the intermediate bush and a spring plate facing the one surface of the intermediate bush, respectively, a first coil spring installed such that opposite ends of the first coil spring are supported by the first conductors and a third conductor is integrally coupled substantially over an entire surface of the first coil spring, a pair of second conductors fixedly installed on the other surface of the intermediate bush and an end of the interior space of the pedal housing facing the other surface of the intermediate bush, a second coil spring installed such that opposite ends of the second coil spring are supported by the second conductors and a fourth conductor is integrally coupled substantially over an entire surface of the second coil spring, and a controller for controlling supply of a current to the first conductors, a current to the second conductors, directions of the currents, and intensities of the currents.

5 Claims, 3 Drawing Sheets

(56) References Cited

U.S. PATENT DOCUMENTS

| | | | | |
|---|---|---|---|---|
| 2004/0011155 A1* | 1/2004 | Kumamoto | ............ | B60K 26/02 74/513 |
| 2009/0069155 A1* | 3/2009 | Dickinson | ............ | B60K 26/021 477/133 |
| 2012/0304799 A1* | 12/2012 | Noh | ............ | B60K 26/021 74/512 |
| 2014/0015180 A1* | 1/2014 | Pepka | ............ | F16F 6/005 267/195 |
| 2015/0152925 A1* | 6/2015 | Min | ............ | F16D 27/14 74/512 |

FOREIGN PATENT DOCUMENTS

| | | | |
|---|---|---|---|
| KR | 100748738 B1 | 8/2007 | |
| KR | 10-1091506 B1 | 12/2011 | |
| KR | 1020120133082 A | 12/2012 | |
| KR | 10-1255332 B1 | 4/2013 | |

* cited by examiner

ACCELERATOR PEDAL APPARATUS WITH VARIABLE PEDAL EFFORT

CROSS-REFERENCE TO RELATED APPLICATION

The present application claims priority of Korean Patent Application Number 10-2013-0152229 filed on Dec. 9, 2013, the entire contents of which application are incorporated herein for all purposes by this reference.

BACKGROUND OF INVENTION

Field of Invention

The present invention relates to an accelerator pedal apparatus with a variable pedal effect, and more particularly to, an accelerator pedal apparatus with a variable pedal effect by which a pedal effect can be varied if necessary by using a coil spring to which a conductor is coupled to generate a magnetic field when a current is applied to the conductor.

Description of Related Art

As vehicles become luxurious, accelerator pedal apparatuses for varying a pedal effect if necessary have been developed.

A pedal effect of an accelerator pedal may be varied at need, considering a body shape or a driving habit of a driver, or may be varied to reduce fatigue of the driver according to frequent manipulations of the accelerator pedal. In particular, a pedal effect may be varied such that a driver properly corresponds to an emergency situation generating during driving of a vehicle.

However, since most conventional accelerator pedal apparatuses with a variable pedal effect employs a motor and gears, they generate much noise, require a large number of parts, and become high-priced. In particular, most conventional accelerator pedal apparatuses have such a long response time that they cannot properly cope with a prompt pedal effect variation during an emergency situation.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made in an effort to solve the above-described problems and/or other problems, and various aspects of the present invention provide an accelerator pedal apparatus with a variable pedal effect by which a pedal effect can be varied at need by using a coil spring to which a conductor is coupled to generate a magnetic field when a current is applied so that noise can be reduced, the number of parts and costs can be reduced, and a pedal effect can be promptly varied even in an emergency situation through a prompt response.

In accordance with various aspects of the present invention, there is provided an accelerator pedal apparatus with a variable pedal effect, the accelerator pedal apparatus including: an intermediate bush installed to be moved along an interior space of a pedal housing; a pair of first conductors fixedly installed on one surface of the intermediate bush and a spring plate facing the one surface of the intermediate bush, respectively; a first coil spring installed such that opposite ends of the first coil spring are supported by the first conductors and to which a third conductor is integrally coupled substantially over an entire surface of the first coil spring; a pair of second conductors fixedly installed on the other surface of the intermediate bush and an end of the interior space of the pedal housing facing the other surface of the intermediate bush; a second coil spring installed such that opposite ends of the second coil spring are supported by the second conductors and to which a fourth conductor is integrally coupled over an entire surface of the second coil spring; and a controller for controlling supply of a current to the first conductors, supply of a current to the second conductors, directions of the currents, and intensities of the currents.

The spring plate may be connected to the pedal arm installed to be rotated about a pedal hinge with respect to the pedal housing.

Conductor coupling grooves may be formed on the one and the other surfaces of the intermediate bush such that the corresponding first conductor and the corresponding second conductor are inserted into and fixed to the conductor coupling grooves, respectively.

A guide groove may be formed on an inner peripheral surface defining the interior space of the pedal housing along a lengthwise direction of the pedal housing, and an outer periphery of the intermediate bush may be inserted into the guide groove to be movable along the guide groove.

A supply direction and an intensity of a current supplied to the first coil spring may be constant such that the pedal arm may be rotated according to a manipulation of the driver. A supply direction and an intensity of a current supplied to the second coil spring may be adjustable for varying a pedal effect of the pedal arm.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrating the accompanying drawings which are given herein below by way of illustration only, and thus are not limitative of the present invention, and wherein.

Figure 1:
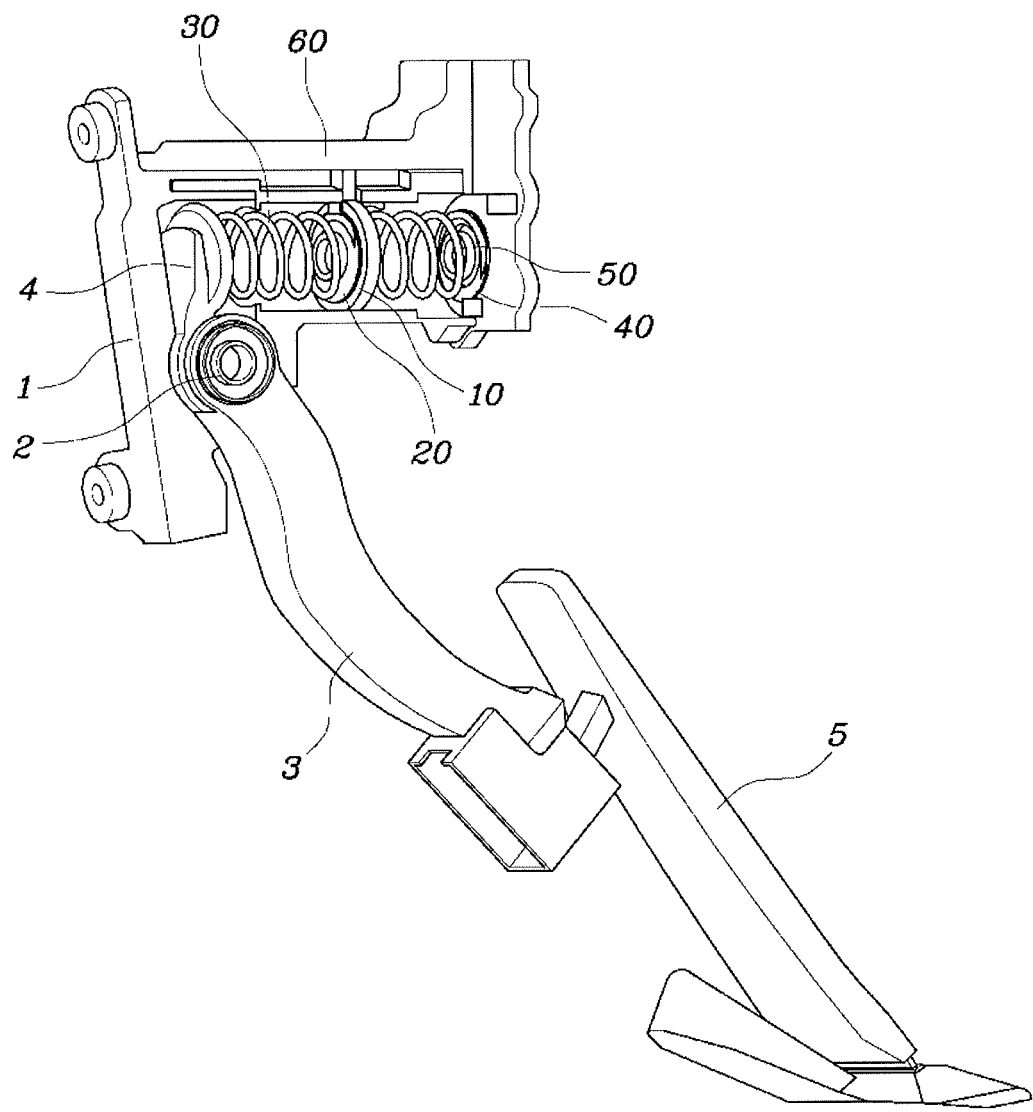
FIG. 1 is a perspective view of an exemplary accelerator pedal apparatus with a variable pedal effort in which a pedal effort can be adjusted by using a magnetic field according to the present invention.
Figure 2:
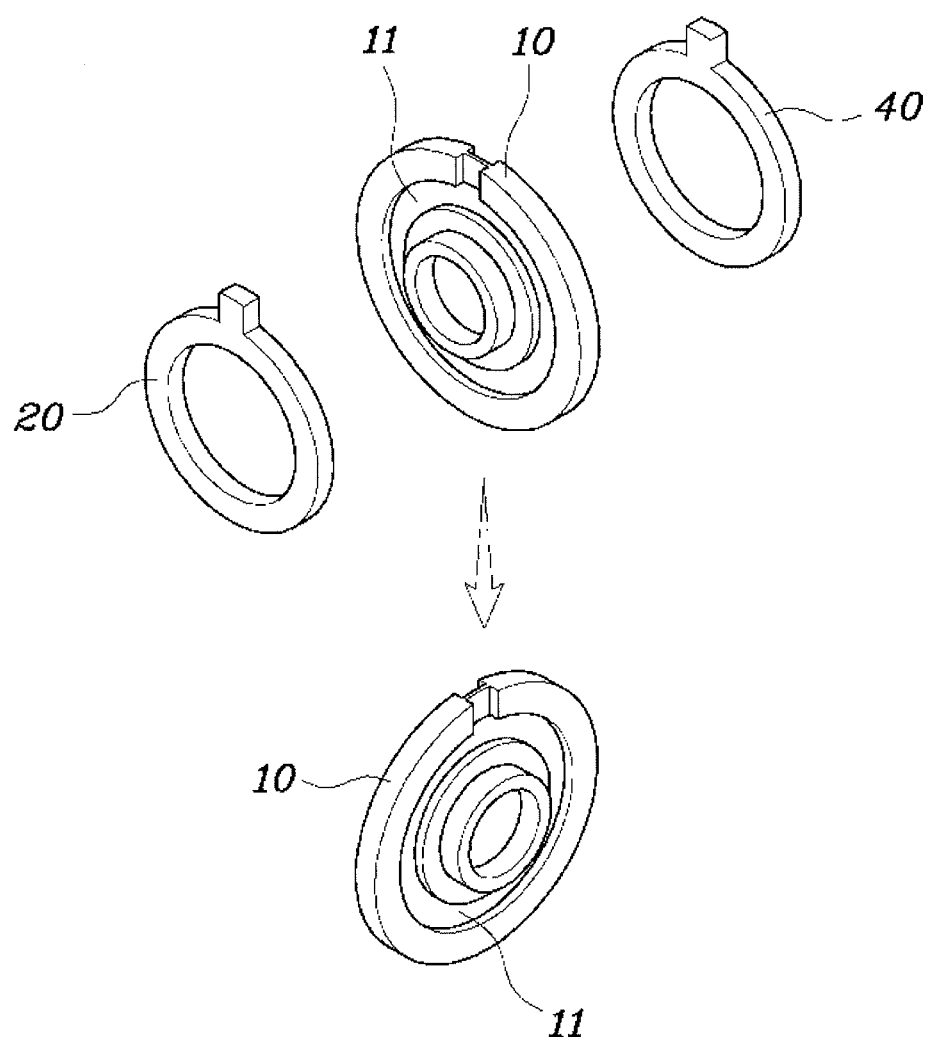
FIG. 2 is a perspective view of an exemplary intermediate bush and first and second conductors according to the present invention.
Figure 3:
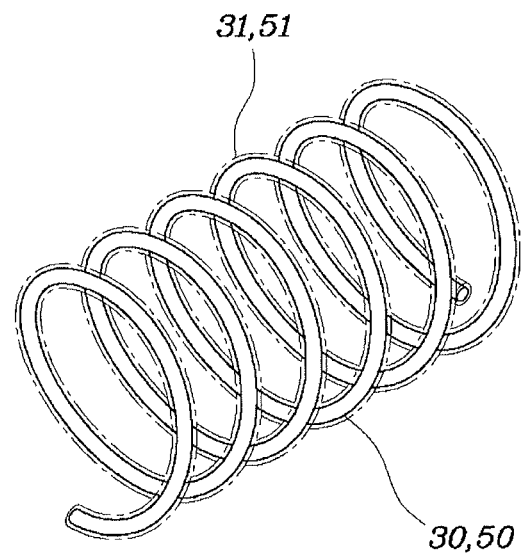
FIG. 3 is a perspective view of exemplary first and second coil springs to which a conductor is coupled according to the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 1 to 4, an accelerator pedal apparatus with a variable pedal effort according to the present invention includes a pedal housing 1 fixedly installed in a body panel (e.g., dash panel) adjacent a driver's seat and having an interior space 1a of a predetermined size, a pedal arm 3 installed to be rotatable about a pedal hinge 2 with respect to the pedal housing 1, and a spring plate 4 located at an entrance of the interior space 1a of the pedal housing 1 and connected to the pedal arm 3.

If a driver pushes a pad 5 to rotate the pedal arm 3, the spring plate 4 is moved in a direction opposite to a manipulation direction of the pedal arm 3, that is, is inserted into the interior space 1a of the pedal housing 1.

The accelerator pedal apparatus with a variable pedal effort according to the present invention further includes an intermediate bush 10 installed to be moved along the interior space 1a of the pedal housing 1; a pair of first conductors 20 fixedly installed on one surface of the intermediate bush 10 and the spring plate 4 facing the one surface of the intermediate bush 10, respectively; a first coil spring 30 installed such that opposite ends of the first coil spring 30 are supported by the first conductors 20 and to which a conductor 31 is integrally or monolithically coupled over or substantially over an entire surface thereof; a pair of second conductors 40 fixedly installed on the other surface of the intermediate bush 10 and an end of the interior space 1a of the pedal housing 1 facing the opposite surface of the intermediate bush 10; a second coil spring 50 installed such that opposite ends of the second coil spring 50 are supported by the second conductors 40 and to which a conductor 51 is integrally or monolithically coupled over or substantially over an entire surface thereof; and a controller 60 for controlling supply of a current to the first conductor 20 and the second conductor 40, a direction of the current, and an intensity of the current.

According to the present invention, conductor coupling grooves 11 having the same or substantially the same shape as the first and second conductors 20 and 40 are formed on opposite surfaces of the intermediate bush 10 such that the first conductor 20 and the second conductor 40 are inserted into and fixed to the conductor coupling grooves 11, respectively.

A guide groove 1b is formed on an inner peripheral surface defining the interior space 1a of the pedal housing 1 along a lengthwise direction of the pedal housing 1, and an outer periphery of the intermediate bush 10 is inserted into the guide groove 1b to be movable along the guide groove 1b.

The guide groove 1b is adapted to guide movement of the intermediate bush 10 but the guide groove 1b is not necessary and may not be formed.

In some embodiments, it is preferable that a supply direction and an intensity of a current supplied to the first coil spring 30 are always constant such that the pedal arm 3 may be rotated according to a manipulation of the driver, and it is preferable that a supply direction and an intensity of a current supplied to the second coil spring 50 are varied to vary a pedal effect of the pedal arm 3 if necessary.

The controller 60 and the first and second conductors 20 and 40 may be connected to each other through an electrically conductive wire 70 or may be electrically connected to each other by using a separate metal conductor.

Hereinafter, an operation of the accelerator pedal apparatus according to various embodiments of the present invention will be described.

Since a supply direction and an intensity of a current supplied to the first coil spring 30 is always constant, the pedal arm 3 is smoothly rotated about the pedal hinge 2 according to a manipulation of the driver and accordingly, an acceleration operation is enabled.

When a magnetic field is not generated in the first coil spring 30 and the second coil spring 50, a pedal effect of the pedal arm 3 is a sum of a repulsive force of the first coil spring 30 and a repulsive force of the second coil spring 50.

In this state, in order to vary a pedal effect, a direction and an intensity of a current supplied to the second spring 50 are adjusted.

Figure 4:
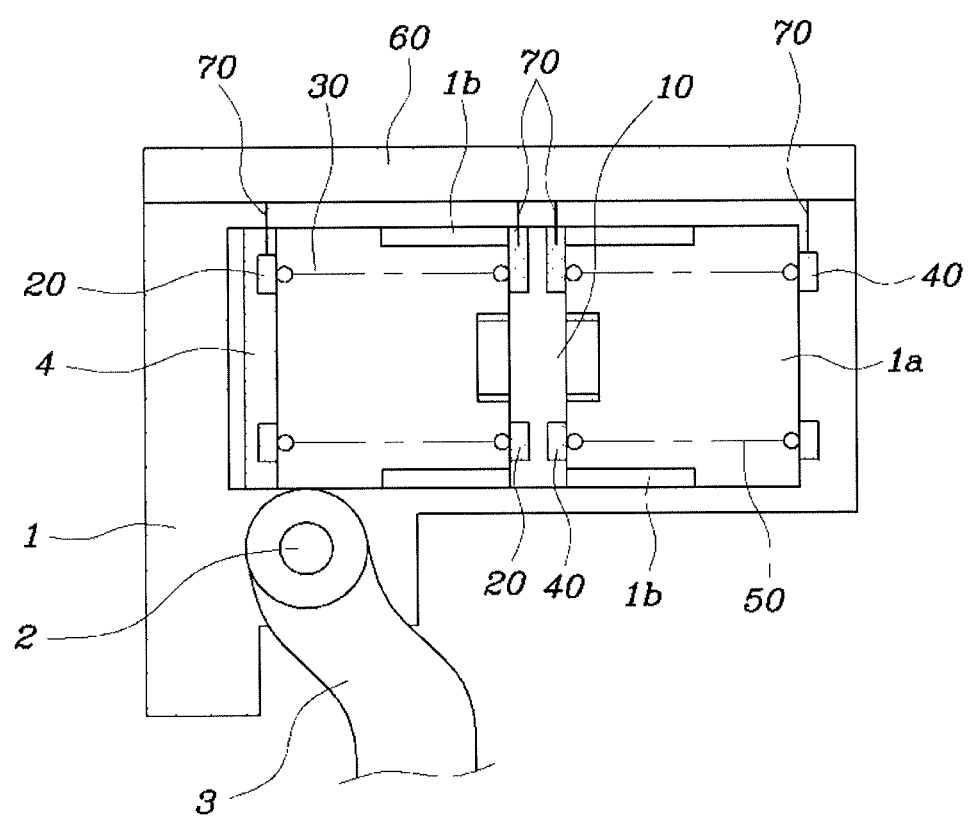
FIG. 4 is a sectional view of an exemplary accelerator pedal apparatus with a variable pedal effort according to the present invention.

For example, in the state of FIG. 4, if a magnetic field in which a left side of the second coil spring 50 corresponds to an N pole and a right side of the second coil spring 50 corresponds to an S pole is generated while a magnetic field in which a left side of the first coil spring 30 corresponds to an N pole and a right side of the first coil spring 30 corresponds to an S pole is generated, an attractive force is generated between the first coil spring 30 and the second coil spring 50, in which case if the pedal arm 3 is manipulated, the intermediate bush 10 is smoothly moved rightwards along the interior space 1a of the pedal housing 10 to decrease a pedal effect.

Further, in the state of FIG. 4, if a magnetic field in which a left side of the second coil spring 50 corresponds to an S pole and a right side of the second coil spring 50 corresponds to an N pole is generated while a magnetic field in which a left side of the first coil spring 30 corresponds to an N pole and a right side of the first coil spring 30 corresponds to an S pole is generated, a repulsive force is generated between the first coil spring 30 and the second coil spring 50, in which case if the pedal arm 3 is manipulated, the intermediate bush 10 is hardly moved to increase a pedal effect.

The decrease and increase of the pedal effect may be adjusted through an intensity of a current.

As described above, in various embodiments of the present invention, since the acceleration pedal apparatus is configured to actively vary a pedal effect of the accelerator pedal if necessary by using a coil spring that can generate a magnetic field, it can significantly reduce noise, reduce the number of parts, and remarkably save costs as compared with a conventional configuration in which a pedal effect is varied by using a motor and gears.

Further, the acceleration pedal apparatus can promptly vary a pedal effect even in an emergency situation due to a configuration that can realize a prompt response performance.

According to the accelerator pedal apparatus with a variable pedal effect, as a pedal effect of an accelerator pedal is actively varied at need by using a coil spring that can generate a magnetic field so that a motor and gears are not used, noise can be reduced, the number of parts and costs can be reduced, and a pedal effect can be promptly varied even in an emergency situation through a prompt response.

For convenience in explanation and accurate definition in the appended claims, the terms "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An accelerator pedal apparatus with a variable pedal effect, the accelerator pedal apparatus comprising:
   an intermediate bush installed to be moved along an interior space of a pedal housing;
   a pair of first conductors fixedly installed on a first surface of the intermediate bush and a spring plate facing the first surface of the intermediate bush, respectively;
   a first coil spring installed such that opposite ends of the first coil spring are supported by the first conductors and to which a third conductor is integrally coupled substantially over an entire surface of the first coil spring;
   a pair of second conductors fixedly installed on a second surface of the intermediate bush and an end of the interior space of the pedal housing facing the second surface of the intermediate bush;
   a second coil spring installed such that opposite ends of the second coil spring are supported by the second conductors and to which a fourth conductor is integrally coupled over an entire surface of the second coil spring; and
   a controller for controlling supply of a current to the first conductors, supply of a current to the second conductors, directions of the currents to the first and second conductors, and intensities of the currents to the first and second conductors.

2. The accelerator pedal apparatus of claim 1, wherein the spring plate is connected to a pedal arm installed to be rotated about a pedal hinge with respect to the pedal housing.

3. The accelerator pedal apparatus of claim 1, wherein conductor coupling grooves are formed on the first and second surfaces of the intermediate bush such that the corresponding first conductor and the corresponding second conductor are inserted into and fixed to the conductor coupling grooves, respectively.

4. The accelerator pedal apparatus of claim 1, wherein a guide groove is formed on an inner peripheral surface defining the interior space of the pedal housing along a lengthwise direction of the pedal housing, and an outer periphery of the intermediate bush is inserted into the guide groove to be movable along the guide groove.

5. The accelerator pedal apparatus of claim 1, wherein a supply direction and an intensity of a current supplied to the first coil spring are constant such that a pedal arm is rotated according to a manipulation of the driver.

* * * * *